(12) United States Patent
Gupta

(10) Patent No.: US 10,110,465 B2
(45) Date of Patent: Oct. 23, 2018

(54) DISTRIBUTED HSRP GATEWAY IN VXLAN FLOOD AND LEARN ENVIRONMENT WITH FASTER CONVERGENCE

(71) Applicant: Cisco Technology, Inc., San Jose, CA (US)

(72) Inventor: Nitish Gupta, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 15/220,423

(22) Filed: Jul. 27, 2016

(65) Prior Publication Data

US 2018/0034722 A1   Feb. 1, 2018

(51) Int. Cl.
| | |
|---|---|
| *H04L 12/28* | (2006.01) |
| *H04L 12/751* | (2013.01) |
| *H04L 12/46* | (2006.01) |
| *H04L 12/713* | (2013.01) |

(52) U.S. Cl.
CPC .......... *H04L 45/08* (2013.01); *H04L 12/4641* (2013.01); *H04L 45/586* (2013.01)

(58) Field of Classification Search
CPC ... H04L 45/08; H04L 12/4641; H04L 45/586; H04L 45/46; H04L 12/18
See application file for complete search history.

(56) References Cited

U.S. PATENT DOCUMENTS

| | | | | |
|---|---|---|---|---|
| 7,486,611 B1* | 2/2009 | Wilson | ...................... | H04L 1/22 370/219 |
| 2010/0189117 A1* | 7/2010 | Gowda | ................... | H04L 12/66 370/401 |
| 2013/0044757 A1* | 2/2013 | Rai | .......................... | H04L 45/58 370/395.53 |
| 2014/0047098 A1* | 2/2014 | Rajah | .................... | H04L 45/586 709/224 |
| 2015/0055650 A1* | 2/2015 | Bhat | ..................... | H04L 12/185 370/390 |
| 2015/0334011 A1* | 11/2015 | Zheng | ..................... | H04L 49/70 370/254 |

* cited by examiner

*Primary Examiner* — Abdelnabi O Musa
(74) *Attorney, Agent, or Firm* — Merchant & Gould P.C.

(57) ABSTRACT

A method of supporting N active, distributed HSRP gateways in a virtual Extensible local area network. The method includes: joining by HSRP active, HSRP standby, HSRP listen gateways a special virtual Extensible LAN tunnel endpoint address; advertising by HSRP active, HSRP standby, HSRP listen gateways its address; assigning priority to HSRP active, HSRP standby, HSRP listen gateways; determining the liveliness of the HSRP active gateway; and the HSRP active gateway sourcing Hello with HSRP VMAC in the inner layer 2 header, and the special virtual Extensible LAN tunnel endpoint address in the outer Layer 3 address; replying by the HSRP active gateway to a broadcast ARP to an HSRP Virtual IP address; forwarding packets destined to Virtual MAC by any of HSRP active, HSRP standby, HSRP listen gateways and replying by HSRP active, HSRP standby, HSRP listen gateways to a unicast ARP to an HSRP Virtual IP address.

20 Claims, 3 Drawing Sheets

DISTRIBUTED HSRP GATEWAY IN VXLAN FLOOD AND LEARN ENVIRONMENT WITH FASTER CONVERGENCE

TECHNICAL FIELD

This application relates to systems and methods for implementing HSRP gateways, and more particularly to supporting N active, distributed HSRP gateways in VxLAN Flood and Learn mode.

BACKGROUND

Hot Standby Router Protocol ("HSRP") serves at the Layer 3 Virtual Extensible Local Area Network ("VXLAN") for hosts in the VxLAN. A Layer 3 VxLAN gateway provides routing between VxLAN segments and between VxLAN to Virtual Local Area Network ("VLAN") segments. A Layer 3 VxLAN Gateway also serves as a gateway for Host's external connectivity.

In a VxLAN flood and learn mode, the Layer 3 HSRP gateway can be deployed in multiple ways in the VxLAN.

First, HSRP can be configured on VxLAN leaf switches which are typically Top of Rack ("TOR") switches. In this deployment, HSRP can be enabled on two TOR switches, also known as VxLAN tunnel endpoints ("VTEP"), connected in virtual Port Channel ("vPC") pair or dedicated Layer 2 peer link to synchronize its states. In this scenario, a spine layer is used as a Layer 3 underlay network to carry the VxLAN overlay tunnels to the TOR switches. In this deployment VxLAN tunnels are originated and terminated on the TOR switches, and the spines do not interpret the VxLAN tunnels. In this case HSRP Active and HSRP Standby parts of a vPC complex, forward packets destined to HSRP VMAC. So there can be only two Active Gateways, as there can be only two switches connected in a vPC complex.

Second, HSRP can be deployed in the spine layer, typically in End of Rack ("EOR") switches. In this scenario, spine layers also act as Layer 3 VxLAN gateways to terminate the VxLAN tunnels for router to external network and inter VxLAN segment routing and acts as a transit point for the packets bridged from one TOR switch to the other. Here as well Spines can be connected in a vPC pair by a dedicated L2 link, with HSRP enabled on two spine switches. In this case HSRP Active and HSRP Standby parts of the vPC complex forward packets destined to HSRP VMAC. So there can be only two Active Gateways, as there can be only two switches connected in a vPC complex.

Third, HSRP can peer itself with packets being flooded on the VxLAN overlay. In this case HSRP Active only forward packets destined to HSRP VMAC. So there can be only one Active Gateway at a time without vPC.

In each of the above three scenarios, HSRP can act as a maximum of two Active gateways, but it cannot be supported beyond two active gateways.

DESCRIPTION OF EXAMPLE EMBODIMENTS

In contrast to the limitation of two active gateways, this disclosure describes a method to support N active, distributed HSRP gateways in VxLAN Flood and Learn mode.

Figure 1:
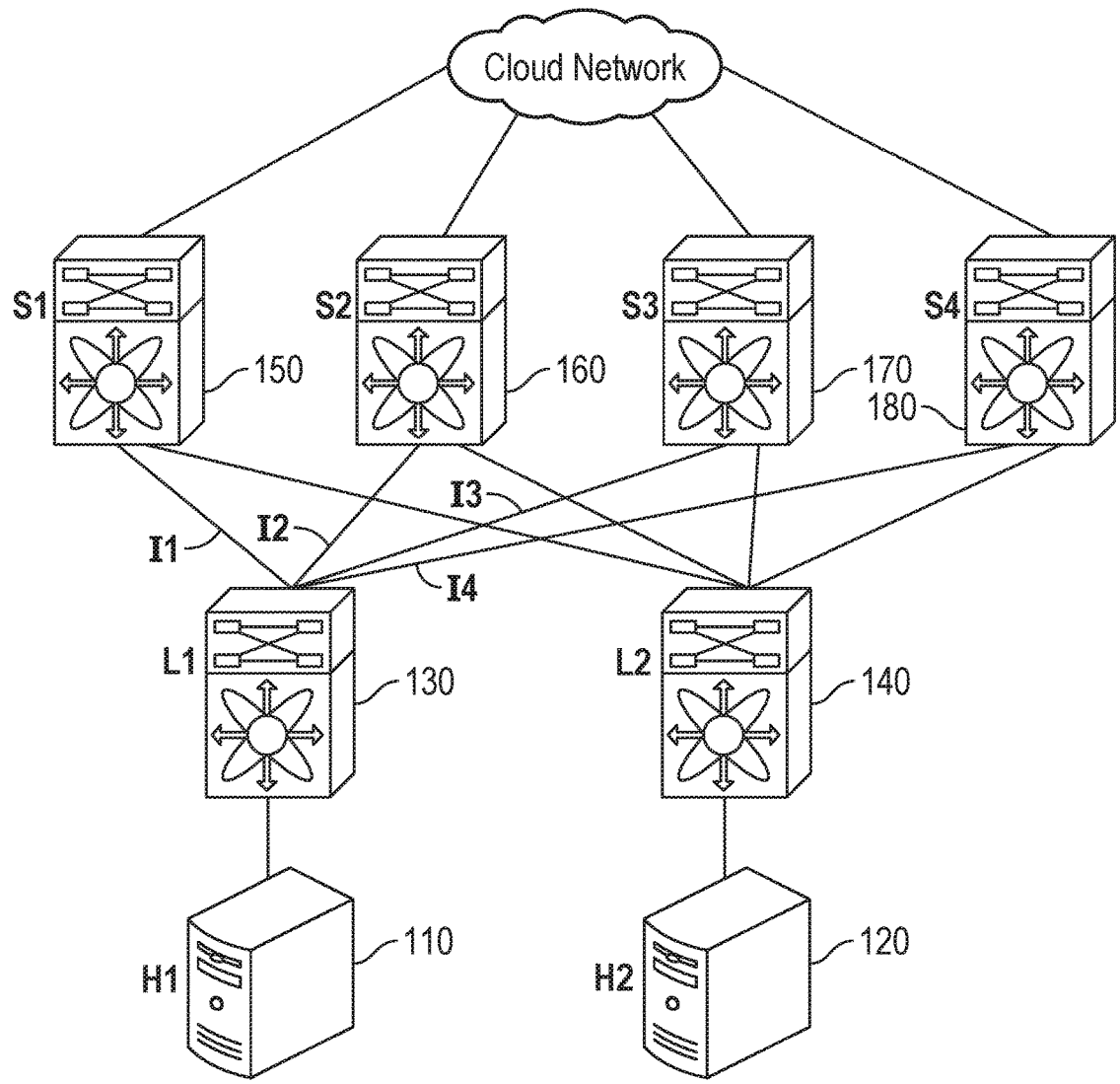
FIG. 1 illustrates an exemplary embodiment of a system implementing an N active, distributed HSRP gateways in VxLAN Flood and Learn mode.

FIG. 1 illustrates an exemplary embodiment of a system implementing an N active distributed HSRP gateways in VxLAN Flood and Learn mode. In particular, FIG. 1 illustrates a six node arrangement. HSRP may be configured on the spine layer or at any of the leaf switches. In one embodiment, the gateways are configured on the spine to reach other gateways in one hop from any place in a VxLAN data center.

HSRP active, HSRP standby, and HSRP listen may join a special VTEP address, which may be the same on all the HSRP peers. The HSRP peers advertise this VTEP address on the underlying network, so that upstream devices learn the route from the HSRP VTEPs and may load-share VxLAN unicast encapsulated traffic between them. HSRP may also assign the gateway priority for each VTEP for the purpose of choosing the HSRP Active, HSRP Standby, and HSRP Listen nodes. In this embodiment, HSRP election is not by hello packet if the choice of underlying routing protocol has a mechanism to communicate the HRSP priority. If the underlying protocol cannot carry the HSRP priority, hello packets may carry the HSRP priority. If the HSRP hello messages carry the priority, it may carry the VTEP priority rather than carrying each configured group priority. This is in contrast to prior art HSRP election mechanisms.

An HSRP Active peer, while sending the hello message may source the packets with HSRP Virtual MAC address ("VMAC") in the same fashion as is performed for the inner Layer 2 header. Along with this, the HSRP Active may use the special VTEP address (described earlier) in the outer Layer 3 IP address to let the other VTEPs learn the HSRP VMAC to the special VTEP IP address mapping and allow other VTEPs to load balance traffic destined to the gateway MAC to any of the HSRP enabled VTEPs. The HSRP standby may continue to send traffic with the real MAC and the real VTEP IP address.

Intermediate System to Intermediate System ("ISIS") may be the underlying routing protocol. HSRP can advertise its VTEP priority coming as part of the ISIS Type Length Values ("TLVs") in the Link State Packet ("LSP"). This may lead the HSRP to be able to run the election on the basis of the VTEP priority with the use of ISIS TLVs. In this mode of operation, HSRP may not use the priority in Hello messages to run the election. Rather, priorities in ISIS TLVs would be used to run the election. If the priorities in the TLVs are the same, then the source MAC address for the LSP may be used to run the HSRP election. In cases where ISIS is not being used and instead Open Shortest Path First ("OSPF") is chosen as the underlying routing protocol, HSRP may use the OSPF opaque LSA to send the HSRP gateway VTEP priority. In case any other routing protocol is used which does not support such capabilities, HSRP hello packets may carry the VTEP priority as described above. HSRP in this case may run the election on the basis of the VTEP priority and peer VTEP MAC address.

HSRP may depend on the underlying routing protocol to determine the liveliness of the HSRP VTEP peer. This will generally be in the sub-second range, rather than the standard 10 second default hold-down timer. Once a peer down is detected, HSRP up peers can run the election on already learned HSRP VTEPS, and convergence will be relatively fast.

The HSRP Active VTEP will reply broadcast Address Resolution Protocol ("ARP") for the HSRP Virtual IP ("VIP"). Unicast ARP can be answered by HSRP Active, HSRP Standby, and HSRP Listen node. While responding to ARP requests, an outer IP address to be used is the HSRP gateway VTEP address. This is used to refresh the other VTEPs for the HSRP VMAC to VTEP address binding. The flow is as follows: first, host H1 110 issues a broadcast ARP to VIP. Leaf VTEP L1 130 receives the packet on a CE port and learns H1 110's MAC address. Leaf VTEP L1 130 may perform VxLAN encapsulation and send out the broadcast packet on a Multicast tree corresponding to the VxLAN segment mapped to the incoming VLAN. Next, if Stem gateway S1 150, for example, is the Active HSRP router on the VxLAN segment, ARP request is received by each of S1 150, S2 160, S3 170, and S4 180, but it is the active HSRP gateway (Stem gateway S1 150) that responds to the broadcast.

Next, Stem gateway S1 150 looks up the VIP. If the HSRP group corresponding to this VIP is active, Stem gateway S1 150 sends an ARP response: OSA(Outer Source ip address)= HSRP GW VTEP ip, ODA(outer Destination ip address)=L1 VTEP IP, ISA(Inner Source MAC Address)=vMAC, IDA (Inner Destination MAC address)=H1. After that, Unicast response reaches Leaf VTEP L1 130, which proceeds to strip off the VxLAN header and switches further to Host H1 110. In this process, Leaf VTEP L1 130 also learns about the VMAC ->HSRP GWVTEP IP binding. So, at this point Host H1 110 has the ARP entry VIP ->VMAC. Host H1 110 may initiate a ping request to Host H2 120: DA(Destination MAC address)=VMAC, SA(Source MAC Address)=H1. Leaf VTEP L1 130 may do a MAC lookup and finds VMAC->HSRP GWVTEP IP.

Leaf VTEP L1 130 then does a VTEP ip lookup. In the example in FIG. 1, VTEP IP has four paths: I1, I2, I3, and I4. Due to hashing, I2, for example, may be picked. VxLAN encapsulation is performed: ODA(outer Destination ip address) =HSRP GW vtep ip, OSA(outer Source ip address) =L1, vtep ip, IDA(Inner Destination MAC address)= vMAC, (Inner Source MAC address)ISA=H1. The packet reaches Stem gateway S2 160 and the packet hits a glean adjacency there (assuming S2 160 does not yet know about H2 120). Stem gateway S2 160 triggers an ARP request for Host H2 120, which is sent as a VxLAN encapsulated multicast packet with ISA(Inner Source MAC address)= RMA(Router MAC address) of S2 160. H2 120 then receives the ARP broadcast and sends a unicast response back to S2 160: SA(Source MAC address)=H2, DA(Destination MAC Address)=RMA(Router MAC address) of S2 160.

Leaf VTEP L2 140 performs VxLAN encapsulation and sends the result to Stem gateway S2 160. S2 160 now has the ARP resolved for Host H2 120, as well as having learned the MAC binding for H2->L2. Subsequent ping packets from Host H1 110 are now forwarded to Host H2 120.

Host H2 120 now triggers an ARP for gateway-IP—VIP2, as H1's IP is in a different subnet. Assuming Stem gateway S2 160 is the active router, S2 160 responds to the VIP query. Note that Stem gateway S2 160 has already learned about Host H2 120 from a previous operation. Host H2 120 now has the ARP for VIP2. It sends out a ping response packet to Host H1 110. If the IP packet hits S2 160, normally S2 160 would not have known about H1 and would have triggered an ARP again. S2 160 would have learned ARP corresponding to H1 110 as well. Thus, S2 160 would IP forward the response back to H1 110.

HSRP Active, HSRP Standby, and HSRP Listen peers may forward traffic destined to the HSRP VMAC. This will lead to the distribution of N Active HSRP gateways in a VxLAN fabric.

Figure 2:
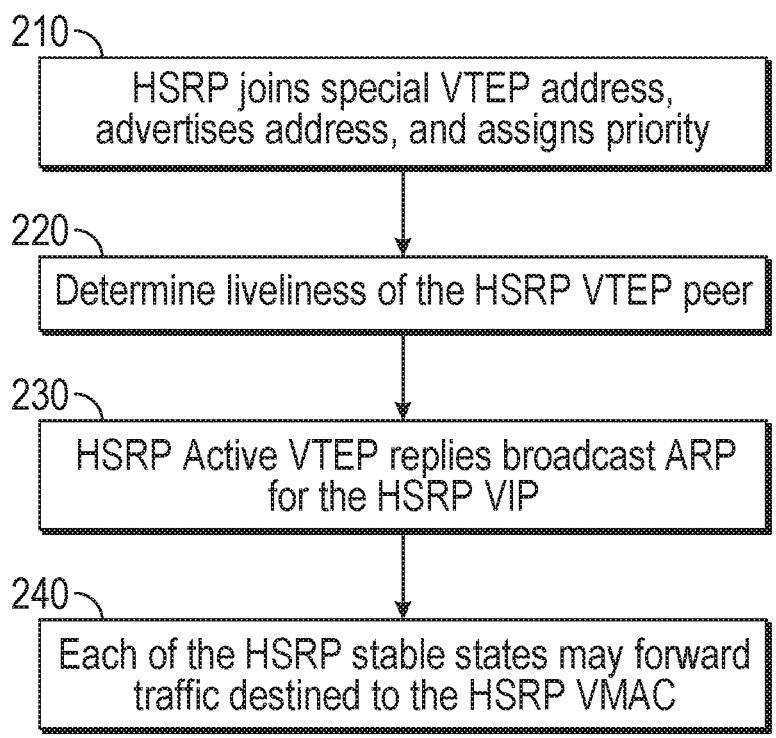
FIG. 2 is a flow chart of a method of supporting N active, distributed HSRP gateways in VxLAN Flood and Learn mode.

FIG. 2 is a flow chart of a method of supporting N active, distributed HSRP gateways in VxLAN Flood and Learn mode. HSRP Active, HSRP Standby, and HSRP Listen peers join a special VTEP address (stage 210). This address may be the same on all the HSRP peers. The HSRP peers advertise this VTEP address on the underlying network. Through this, upstream devices may learn the route from the HSRP VTEPs and may load-share VxLAN unicast encapsulated traffic between them. HSRP, during this stage, may also assign the gateway priority from this VTEP for the purpose of choosing the HSRP Active, HSRP Standby, and HSRP Listen peers. If the underlying routing protocol has a mechanism to communicate HSRP priority, then this underlying mechanism is used instead of hello packets. If not, hello packets may be used, and these hello packets carry the VTEP priority. This has been described previously.

The HSRP may use the underlying routing protocol to determine the liveliness of the HSRP VTEP peer (stage 220). Normally, this will be in the sub-second range. Once a peer down is detected, HSRP up peers can run an election on already learned HSRP VTEPS, so that convergence will be relatively fast.

The HSRP Active VTEP will reply broadcast ARP for the HSRP Virtual IP (stage 230). While responding to ARP requests, an outer IP address to be used is the HSRP gateway VTEP address. This refreshes the other VTEPs for the HSRP VMAC to VTEP address binding.

HSRP Active, HSRP Standby, and HSRP Listen may forward traffic destined to the HSRP VMAC, leading to the distribution of HSRP gateways in a VxLAN fabric.

Figure 3:
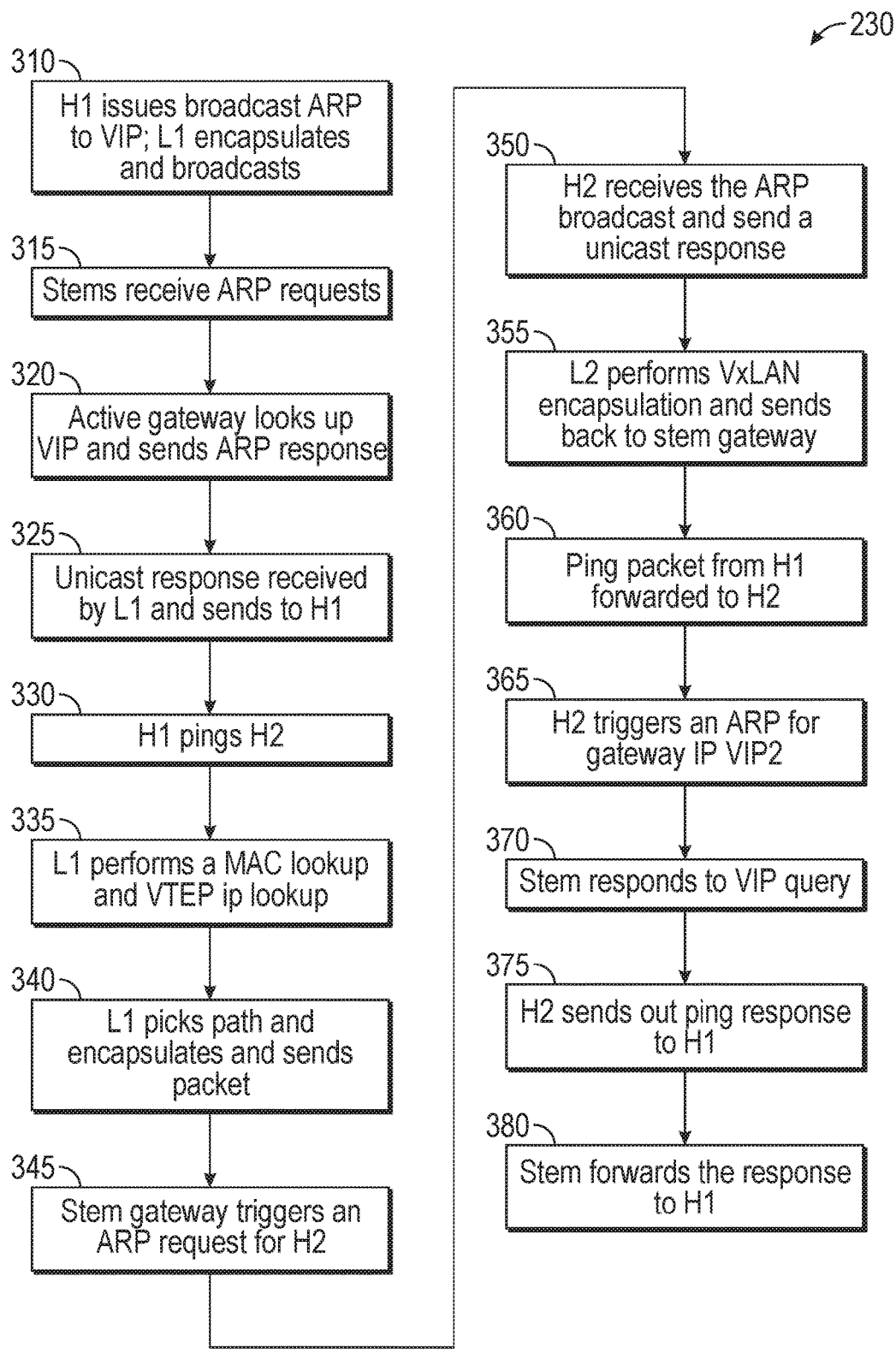
FIG. 3 illustrates a method for two hosts to talk to each other using the Distributed HSRP Gateways.

FIG. 3 illustrates a method for two hosts to talk to each other using the Distributed HSRP Gateways. Host H1 issues a broadcast ARP to VIP (stage 310). Leaf VTEP L1 130 receives the packet on a CE port and learns H1 110's MAC address. Leaf VTEP L1 130 may perform VxLAN encapsulation and send out the broadcast packet on a Multicast tree corresponding to the VxLAN segment mapped to the incoming VLAN. If Stem gateway S1 150, for example, is the active router on the VxLAN segment, ARP request is received by each of S1 150, S2 160, S3 170, and S4 180 (stage 315).

Stem gateway S1 150 looks up the VIP. If the HSRP group corresponding to this VIP is active, Stem gateway S1 150 sends an ARP response: OSA(Outer source IP address)= HSRP GW VTEP ip, ODA(Outer Destination IP Address)= L1 VTEP IP, ISA(inner source MAC address)=vMAC, IDA (inner destination MAC address)=H1 (stage 320). Unicast response reaches Leaf VTEP L1 130, which proceeds to strip off the VxLAN header and switches further to Host H1 110 (stage 325).

Host H1 110 may initiate a ping request to Host H2 120: DA(Destination MAC Address)=VMAC, SA(Source MAC address)=H1 (stage 33). Leaf VTEP L1 130 may do a MAC lookup and finds VMAC->HSRP GW VTEP Vtep IP (stage 335) Leaf VTEP L1 130 then does a VTEP ip lookup. In the example in FIG. 1, VTEP IP has four paths: I1, I2, I3, and I4.

Due to hashing, I2, for example, may be picked by L1. VxLAN encapsulation is performed: ODA(Outer Destination IP Address)=HSRP GW vtep ip, OSA(Outer Source IP address)=L1, vtep ip, IDA(Inner destination MAC address)=vMAC, ISA(Inner Source MAC Address)=H1. The packet reaches Stem gateway S2 160 and the packet hits a glean adjacency there (assuming S2 160 does not yet know about H2 120) (stage 340). Stem gateway S2 160 triggers an ARP request for Host H2 120, which is sent as a VxLAN encapsulated multicast packet with ISA(Inner Source MAC address)=RMA(Router MAC address) of S2 160 (stage 345).

H2 120 then receives the ARP broadcast and sends a unicast response back to S2 160: SA(Source MAC Address)=H2, DA(Destination MAC address)=RMA(Router MAC address) of S2 160 (stage 350). Leaf VTEP L2 140 performs VxLAN encapsulation and sends the result to Stem gateway S2 160. S2 160 now has the ARP resolved for Host H2 120, as well as having learned the MAC binding for H2->L2 (stage 355). Subsequent ping packets from Host H1 110 are now forwarded to Host H2 120 (stage 360).

Host H2 120 now triggers an ARP for gateway-IP—VIP2, as H1's IP is in a different subnet (stage 365). Assuming Stem gateway S2 160 is the active router, S2 160 responds to the VIP query (stage 370). Note that Stem gateway S2 160 has already learned about Host H2 120 from a previous operation. Host H2 120 now has the ARP for VIP2. It sends out a ping response packet to Host H1 110 (stage 375). Finally, the stem forwards the response to the ping to H1 (stage 380).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

I claim:

1. A method comprising:
configuring a plurality of hot standby router protocol (HSRP) gateways at a virtual extendible local area network (VxLAN), wherein the plurality of HSRP gateways comprises a HSRP active gateway, a HSRP standby gateway, and a HSRP listen gateway, and wherein the plurality of HSRP gateways are configured to provide routing between VxLAN segments and between the VxLAN segments and virtual local area (VLAN) segments;
joining by each of the HSRP active gateway, the HSRP standby gateway, and the HSRP listen gateway a special virtual local area network (LAN) tunnel endpoint ("VTEP") address;
advertising by each of the HSRP active gateway, the HSRP standby gateway, and the HSRP listen gateway its respective address;
assigning a priority to each of the HSRP active gateway, the HSRP standby gateway, and the HSRP listen gateway;
determining the liveliness of the HSRP active gateway;
replying by the HSRP active gateway to a broadcast address resolution protocol (ARP) to an HSRP Virtual IP address; and
replying by each of the HSRP active gateway, the HSRP standby gateway, and the HSRP listen gateway to a unicast ARP to the HSRP Virtual IP address.

2. The method of claim 1, further comprising each of the HSRP active gateway, the HSRP standby gateway, and HSRP listen gateway forwarding traffic destined to HSRP gateway's virtual media access control (VMAC) address.

3. The method of claim 1, wherein replying by the HSRP active gateway to the broadcast ARP to the HSRP Virtual IP address further comprises:
receiving an ARP request; and
sending an ARP response.

4. The method of claim 3, wherein replying by the HSRP active gateway to the broadcast ARP to the HSRP Virtual IP address further comprises:
pinging from a first host to a second host.

5. The method of claim 4, wherein replying by the HSRP active gateway to the broadcast ARP to the HSRP Virtual IP address further comprises:
upon receiving a ping request, performing a media access control (MAC) lookup by a first leaf VTEP that receives the ping request from the first host;
picking a path by the first leaf VTEP;
encapsulating the ping request as a ping packet; and
sending the ping packet to the HSRP active gateway.

6. The method of claim 5, wherein replying by the HSRP active gateway to the broadcast ARP to the HSRP Virtual IP address further comprises:
upon receiving the ping packet, triggering an ARP request for the second host at the HSRP active gateway.

7. The method of claim 6, wherein replying by the HSRP active gateway to the broadcast ARP to the HSRP Virtual IP address further comprises:
sending a unicast response from the second host to the ARP request to a second leaf VTEP.

8. The method of claim 7, wherein replying by the HSRP active gateway to the broadcast ARP to the HSRP Virtual IP address further comprises:
performing at the second leaf VTEP encapsulation of the ARP response and sending the encapsulated ARP back to the HSRP active gateway.

9. The method of claim 8, wherein replying by the HSRP active gateway to the broadcast ARP to the HSRP Virtual IP address further comprises:
forwarding the ping packet from the first host to the second host and the second host triggering an ARP for a gateway IP to a second virtual IP.

10. The method of claim 9, wherein replying by the HSRP active gateway to the broadcast ARP to the HSRP Virtual IP address further comprises:
responding by the HSRP active gateway to a second virtual IP query; and sending by the second host a ping response to the first host.

11. A system comprising:
a processor; and
a memory operatively connected with the processor storing computer-executable instructions that, when executed by the processor, causes the processor to execute a method that comprises:
configuring a plurality of hot standby router protocol (HSRP) gateways at a virtual extendible local area network (VxLAN), wherein the plurality of HSRP gateways comprises a HSRP active gateway, a HSRP standby gateway, and a HSRP listen gateway, and wherein the plurality of HSRP gateways are configured to provide routing between VxLAN segments and between the VxLAN segments and virtual local area (VLAN) segments;
joining by the plurality of HSRP gateways a special virtual LAN tunnel endpoint ("VTEP") address;
advertising by the plurality of HSRP gateways its address;
assigning priority to the plurality of HSRP gateways;
determining the liveliness of the HSRP active gateway;
replying by the HSRP active gateway to a broadcast address resolution protocol (ARP) to a HSRP Virtual IP address; and
replying by the plurality of HSRP gateways to a unicast ARP to the HSRP Virtual IP address.

12. The system of claim 11, wherein the method, executed by the processor, further comprises, the plurality of HSRP gateways forwarding traffic destined to the plurality of HSRP gateway's virtual media access control (VMAC) address.

13. The system of claim 11, wherein the method, executed by the processor, further comprises:
receiving an ARP request; and
sending an ARP response.

14. The system of claim 13, wherein replying by the HSRP active gateway to the broadcast ARP to the HSRP Virtual IP address further comprises:
pinging from a first host to a second host.

15. The system of claim 14, wherein replying by the HSRP active gateway to the broadcast ARP to the HSRP Virtual IP address further comprises:
upon receiving a ping request, performing a MAC lookup by a first leaf VTEP that receives the ping request from the first host;
picking a path by the first leaf VTEP;
encapsulating the ping request as a ping packet; and
sending the ping packet to the HSRP active gateway.

16. The system of claim 15, wherein replying by the HSRP active gateway to the broadcast ARP to the HSRP Virtual IP address further comprises:
upon receiving the ping packet, triggering an ARP request for the second host at the HSRP active gateway.

17. The system of claim 16, wherein replying by the HSRP active gateway to the broadcast ARP to the HSRP Virtual IP address further comprises:
sending a unicast response from the second host to the ARP request to a second leaf VTEP.

18. The system of claim 17, wherein replying by the HSRP active gateway to the broadcast ARP to the HSRP Virtual IP address further comprises:
performing at the second leaf VTEP encapsulation of the ARP response and sending the encapsulated ARP response back to the HSRP active gateway.

19. The system of claim 18, wherein replying by the HSRP active gateway to the broadcast ARP to the HSRP Virtual IP address further comprises:
forwarding the ping packet from the first host to the second host and the second host triggering an ARP for a gateway IP to a second virtual IP.

20. The system of claim 19, wherein replying by the HSRP active gateway to the broadcast ARP to the HSRP Virtual IP address further comprises:
responding by the HSRP active gateway to a second virtual IP query; and
sending by the second host a ping response to the first host.

* * * * *